Patented Dec. 23, 1930

1,785,799

UNITED STATES PATENT OFFICE

BYRON L. WEST, OF HAMBURG, NEW YORK, ASSIGNOR TO NATIONAL ANILINE & CHEMICAL COMPANY, INC., OF NEW YORK, N. Y., A CORPORATION OF NEW YORK

AZO COLORING MATTER

No Drawing.  Application filed October 24, 1927. Serial No. 228,498.

This invention relates to the manufacture and production of new azo coloring matters of the benzidine series which are of value in dyeing paper, cotton, wool, silk and other material. The invention includes the new dyestuffs and the material dyed with the same.

The new dyestuffs can be prepared by the hydrolytic decomposition in the presence of water, and preferably in an alkaline medium, of the diazo-disazo body, pp'-diazo-diphenyl-2-azo-3.6-disulfo-1.8-aminonaphthol-7-azo-benzene, having in the free state the probable formula

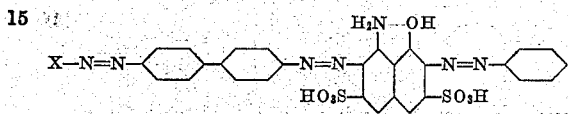

wherein X represents an acid radical, preferably an inorganic acid radical such as $(SO_4)\frac{1}{2}$, $HSO_4$, Cl, etc. The hydrolytic decomposition is preferably effected by drying the moist and alkaline filtercake comprising the diazo-disazo body in an oven; but it may be effected by heating the body in aqueous solution or suspension. In the decomposition, nitrogen is evolved and the dyestuff is produced.

The composition and formula of the dyestuff thus produced is not definitely known; but in view of the known fact that a diazo body upon hydrolytic decomposition (i. e., decomposition with evolution of nitrogen in the presence of water) ordinarily produces the corresponding hydroxy-body by the replacement of the diazo group by a hydroxyl group, it appears probable that the new dyestuff, or a major part of it, has in the free state the following probable formula:

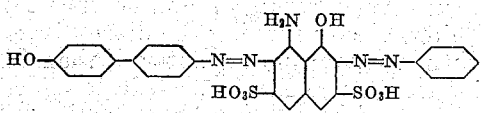

The following specific example will further illustrate the invention, but it will be understood that the invention is not limited thereto. The parts are by weight. Example: 154 parts (1 mol) of benzidine, in the form of benzidine sulfate, is suspended in a solution comprising about 3000 parts of water and 270 parts of 20° Bé. hydrochloric acid, cooled to a temperature of about 8° to 10° C. by the addition of ice, and tetrazotized by the slow addition, with stirring, of about 116 parts of sodium nitrite of 97 percent purity, taking care that the temperature does not rise above about 15°–17° C. After 2 to 3 hours, the final solution should be clear and substantially free from insoluble material. To the tetrazo solution thus obtained, there is slowly introduced, with stirring, a solution of 270 parts (1 mol) of H-acid (i. e., 8.1-amino-naphthol-3.6-disulfonic acid) obtained by treating the H-acid with 6200–6300 parts of water and an amount of caustic soda sufficient to effect complete solution of the acid without showing an alkaline reaction toward brilliant yellow paper. The mixture is stirred at a temperature of about 15° C. until the coupling is substantially complete. This ordinarily requires about 16–17 hours. The intermediate product or substance so formed is probably a sodium salt of a diazo-monazo product of an acid having in the free state the following probable formula:

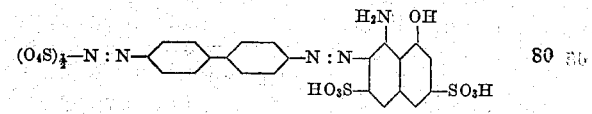

and is obtained as a violet colored precipitate. To the reaction mass containing the diazo-monazo product, and cooled to a temperature of about +5° C. by the addition of ice, there is added a solution of diazobenzene prepared by diazotizing 79 parts (1.04 mols) of aniline in any suitable manner, for example, by adding thereto 400 parts of water and 230 parts of 30° Bé. hydrochloric acid, then slowly adding sufficient sodium nitrite (about 60 parts) to effect diazotization, keeping the temperature below about +2° C. There is then quickly added to the mixture thus obtained, while stirring well, a solution of 400 parts of sodium carbonate in 1200 parts of water. Coupling of the diazobenzene with the diazo-monazo body takes place. The mixture is stirred at a temperature of about 5°-10° C. for about an hour or until the coupling is completed, the precipitated diazo-disazo body is filtered off on a filter press, and the moist press-cake is dried in thin layers on enamel, iron or copper pans in a shelf atmospheric or vacuum drier at a temperature of about 80° C. During drying the product foams or puffs up with evolution of nitrogen. When dry, it is ground or powdered.

The dyestuff thus obtained, which is in the form of its sodium salt, is a grayish to brownish black powder, soluble in water forming a bluish green solution which upon acidification with hydrochloric acid produces a dark bluish green precipitate, and soluble in concentrated sulfuric acid giving a reddish-blue solution which upon dilution with water gives a bluish to greenish black precipitate. From a neutral bath, the dyestuff dyes cotton bluish-green shades which are discharged to a white, or substantially so, by treatment with alkaline hydrosulfite. It is an excellent dye for union goods since it dyes cotton, wool and silk substantially the same shade. It also dyes paper and other material, but leaves cellulose acetate (Lustron) practically unstained.

In the above example, the amount of aniline employed is somewhat in excess of the theory (i. e., one mol) but larger or smaller amounts may be used. Smaller amounts produce somewhat redder shades. Benzidine base or other benzidine salts may be tetrazotized in place of benzidine sulfate. The aniline may be diazotized in the presence of sulfuric acid instead of hydrochloric acid, and when sulfuric acid is used, the precipitated diazo-disazo body is obtained as the sulfate. The benzidine, H-acid and aniline should be substantially free from any large amount of impurities, otherwise inferior results as to shade and yields are obtained. The filter-cake is alkaline in reaction since it contains sodium carbonate. The press-cake may be suspended in water and boiled to effect decomposition and the dye salted out by the addition of lime-free sodium chloride; or the reaction-mass containing the precipitated diazo-disazo body may be heated to boiling to effect decomposition. Better yields are obtained, however, by drying the moist press-cake and thus avoiding the losses due to the solubility of the final dyestuff.

I claim:

1. The process of producing an azo coloring matter, which comprises subjecting to hydrolytic decomposition a diazo-disazo body having in the free state the following probable formula:

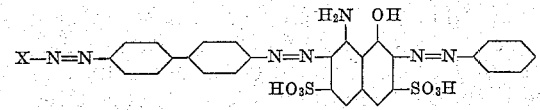

wherein X denotes an acid radical.

2. The process of producing an azo coloring matter, which comprises decomposing the moist, alkaline diazo-disazo body having in the free state the following probable formula:

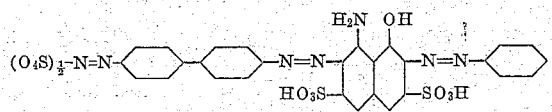

by subjecting the same to a temperature not above about 80° C.

3. The process of producing an azo coloring matter, which comprises subjecting to hydrolytic decomposition in the presence of water and of an alkaline substance, the diazo-disazo body having in the free state the following probable formula:

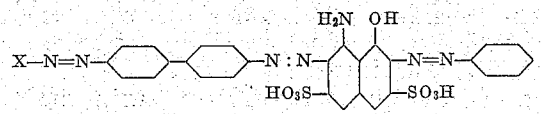

wherein X denotes an acid radical.

4. A composition which comprises as its major component the coloring matter obtainable by the hydrolytic decomposition in an alkaline medium of the diazo-disazo body having in the free state the following probable formula:

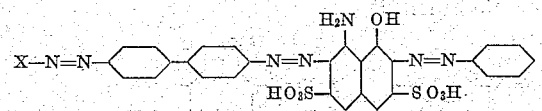

wherein X denotes an acid radical; said coloring matter in the form of its sodium salt being soluble in water with a bluish green color, being soluble in concentrated sulfuric acid, with a reddish blue color, and dyeing cotton, wool and silk bluish-green shades from a neutral bath.

5. As a new product, the disazo dyestuff having in the free state the following probable formula:

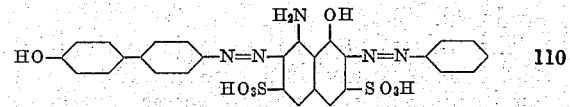

6. As a new product, the coloring matter obtainable by coupling one molecular proportion of tetrazotized benzidine with one molecular proportion of H-acid in an acid medium to form a diazo-monazo body, then treating the diazo-monazo body thus obtained with an excess of diazo-benzene in an alkaline medium whereby a diazo-disazo body is produced, and then filtering off and heating the moist filter-cake containing the diazo-disazo body thus produced and a quantity of the said alkaline medium to effect the hydrolytic decomposition of said diazo-disazo body and produce thereby a coloring matter which in the dry state in the form of its sodium salt is a dark powder soluble in water with a bluish-green coloration, soluble in concentrated sulfuric acid with a reddish blue coloration; and which from a neutral bath dyes cotton, wool and silk bluish green shades.

7. Material dyed with the coloring matter of claim 4.

8. Material dyed with the dyestuff of claim 5.

9. Material dyed with the coloring matter of claim 6.

10. As a new product, the coloring matter obtainable by coupling one molecular proportion of tetrazotized benzidine with one molecular proportion of H-acid in an acid medium to form a diazo-monazo body, then treating the diazo-monazo body thus obtained with an excess of diazo-benzene in an alkaline medium whereby a diazo-disazo body is produced, filtering off the diazo-disazo body, suspending said body in an alkaline solution, heating said suspension to effect hydrolytic decomposition of said diazo-disazo body and salting out the resulting coloring matter from said suspension; said coloring matter being soluble in concentrated sulfuric acid with a reddish blue coloration and dyeing from a neutral bath cotton, wool, and silk bluish green shades.

11. Material dye with the coloring matter of claim 10.

In testimony whereof I affix my signature.

BYRON L. WEST.